United States Patent [19]

Hrycik

[11] 4,149,022
[45] Apr. 10, 1979

[54] POWER CONTROL SYSTEM FOR ELECTRICALLY MELTING GLASS

[75] Inventor: Kenneth S. Hrycik, Eastlake, Ohio

[73] Assignee: General Electric Company, Schenectady, N.Y.

[21] Appl. No.: 901,318

[22] Filed: May 1, 1978

[51] Int. Cl.$^2$ ................................................ C03B 5/02
[52] U.S. Cl. ................................................................ 13/6
[58] Field of Search .................................... 13/6, 23, 25

[56] References Cited

U.S. PATENT DOCUMENTS

| | | | |
|---|---|---|---|
| 2,773,111 | 12/1956 | Arbeit et al. | 13/6 |
| 3,852,509 | 12/1974 | Rutledge et al. | 13/6 |

Primary Examiner—R. N. Envall, Jr.
Attorney, Agent, or Firm—John F. McDevitt; Lawrence R. Kempton; Frank L. Neuhauser

[57] ABSTRACT

A power control system to distribute the electrical energy being supplied to a glass melting furnace of the vertically oriented type wherein raw glass batch is fed at the top level of the melting chamber and molten glass withdrawn at the bottom level of said chamber. Specifically, the present control system supplies electrical power to three sets of electrodes located at different elevation levels in the melting chamber so that when power is increased to the intermediate level electrodes, there is a decrease in power applied to the top level electrodes while a constant power ratio is maintained between the intermediate and bottom level electrodes. Said control system can further include cooperative electrode heating means to refine the molten glass being continuously withdrawn from the bottom of the melting chamber in a separate refining chamber connected thereto. By controlling the glass melting process in this manner, improved temperature control is maintained and hot spots can be generated in the molten glass adjacent the underside of the batch blanket causing a flow of gas bubbles upwardly through the glass at the hot spot locations for escape through the batch blanket.

32 Claims, 3 Drawing Figures

POWER CONTROL SYSTEM FOR ELECTRICALLY MELTING GLASS

CROSS REFERENCE TO RELATED APPLICATION

A related method and apparatus for electrically melting glass is described in co-pending patent application Ser. No. 901,315, filed concurrently herewith, in the names of Kenneth S. Hrycik, John H. Leonhardt, and William J. Prentice, which is assigned to the assignee of the present invention. In said co-pending application, there is provided improved electrode heating means to generate localized hot spots in the molten glass adjacent the underside of the batch blanket which cause a flow of gas bubbles upwardly through the glass at the hot spot locations for escape through the batch blanket. The electrical energy rates supplied to said electrode means can also be controlled so that a uniform thickness batch blanket is maintained during the glass melting process. Said improved glass melting system can further include cooperative means to refine the molten glass being continuously withdrawn from the bottom of the melting chamber in a separate refining chamber connected thereto. In a preferred glass furnace for carrying out the improved melting process, there is employed three sets of electrode heating means utilizing separate control means for applying electrical energy to each set of electrodes. Accordingly, the present invention pertains to a particular control system which can be utilized in the already known glass furnace construction and thereby represents an improvement thereof.

BACKGROUND OF THE INVENTION

As already disclosed in the aforementioned co-pending patent application, it is known to melt a glass batch continuously in a vertically oriented melting chamber formed of conventional refractory material using various type electrode arrangements supplied with alternating current. It is also known to locate one set of heating electrodes at the upper level of the molten glass zone and to further include at least one set of electrodes located therebelow in the molten glass having separate control means for applying electrical energy to each set of electrodes. As also already known, the method and apparatus described in said co-pending application ameliorates problems encountered when the raw batch material cannot be continuously and uniformly melted in said chamber to provide reliable degasification of the molten glass in a manner imparting improved thermal efficiency for the glass melting process.

In one earlier known power control system for continuous glass melting entirely by electrical energy in this general type vertically oriented melting furnace there is employed two sets of electrodes disposed in the upper level of the melting chamber with the lower region of said melting chamber being devoid of electrode heating means so that the molten glass can be completely refined in said lower region of the melting chamber by radiant heat penetrating from the upper zone with a minimum of turbulent glass circulation. The molten glass temperature is said to be maintained greatest intermediate said electrode levels and dissimilar electrode configurations are utilized at each of said levels in order to further obtain a particular thermal circulation path in the molten glass said to be desirable. In a different power control system reported to be useful for electrically melted glass in this same general manner, there is disclosed three electrode levels aligned vertically in the melting chamber and which employ a set of six electrodes with pairs of said electrodes being connected to each phase of a three-phase alternating current power supply. The rate of electrical power being supplied to each level of electrodes in the melting chamber is controlled set of the rate being greatest at the top level electrodes and decreasing successively at each level therebelow which is said to be desirable in order to refine the molten glass at the lowest level in the melting chamber before being withdrawn therefrom. In a more recently reported power control system for melting glass in the same general manner, there is disclosed control means wherein a set of electrodes disposed at the mid-level in the melting chamber is operatively associated with a second set of electrodes disposed at the top level of the melting chamber so as to vary the electrical power distribution therebetween in various ways. The individual power control means for each electrode level cooperate to exercise power ratio control which can be constant or variable and further temperature control means are associated with the control loop for the lower level electrodes to exercise limited authority in this control system. The temperature control being exercised in the melting chamber is said to permit refining of the molten glass in the lowermost region of a vertically oriented type furnace construction.

SUMMARY OF THE INVENTION

There is clearly a continuing need for improved temperature control in the molten glass when melted entirely by electrical energy being supplied to a vertically oriented melting chamber. It has now been discovered, surprisingly, that more effective temperature control can be exercised throughout the molten glass in the melting chamber if the electrical energy supplied to the electrode heating means is distributed in a particular manner. Specifically, the present control system includes a set of electrodes located adjacent said top level in the melting chamber and connected to a first power supply means, a set of electrodes located at the bottom of level of the melting chamber and connected to a second power supply means, a set of electrodes located at a level in the melting chamber intermediate said bottom and top level of electrodes connected to a third power supply means, and control means for applying electrical power to the top and intermediate level electrodes so that when power is increased to the intermediate level electrodes, there is a decrease in power applied to the top level electrodes while a constant power ratio is maintained between the intermediate and bottom level of electrodes. By operating the control system in the foregoing manner, it becomes possible to exercise temperature control in the molten glass more effectively throughout the entire melting chamber for both increased thermal efficiency and reliable degasification of the molten glass. Improved temperature control as compared with the prior art methods wherein power ratio control was utilized for the most part has been found to be the most effective means to vary the electrical energy demands with variations in glass batch charging rate, batch composition, and the molten glass pull rate from the glass furnace. By varying the electrical energy distribution in accordance with the present invention, it is possible to maintain a uniform thickness of the glass batch blanket which floats on top of the molten glass in the melting chamber as compared with the prior art methods wherein the electrical power levels are raised at the top level electrodes as well as at the intermediate level electrodes.

In a preferred embodiment of the present control system, the included temperatures control means provide a relatively constant molten glass temperature adjacent the intermediate electrode level at the desired set point value. The molten glass temperature is maintained greatest in said zone and conventional power controller means are utilized at all electrode levels in the melting chamber wherein said power controller means also compare the measured power levels with set point values associated with the individual controllers. The preferred glass furnace construction further includes a refining chamber connected at the bottom level of the melting chamber with separately controlled heating electrodes and a forehearth arrangement to condition the refined glass before withdrawal. The power supply means separately connected to each level of electrodes can consist of three-phase alternating current supplies power to a pair of electrodes and with said power distribution including separate power transformer means to supply each pair of electrodes. In the preferred electrical circuit means for carrying out the present control system, a first control signal derived by the power controller means for the intermediate level electrodes provides an input signal to a first modifier means connected and the power controller means for the top level electrodes and the output signal from said first modifier means provides a second input control signal to said power controller means to the top level electrodes while said first control signal provides a further input signal to second modifier means connected to the power controller means for the bottom level electrodes and the output signal from said second modifier means provides a third input control signal to said power controller means for the bottom level electrodes. The conventional temperature controller being utilized in the preferred control system provides an input signal to the power controller means for the intermediate level electrodes to vary the amount of power supplied to said electrodes so that the glass temperature thereat remains equal to the set point value established for said temperature controller.

DESCRIPTION OF THE PREFERRED EMBODIMENTS

Figure 1:
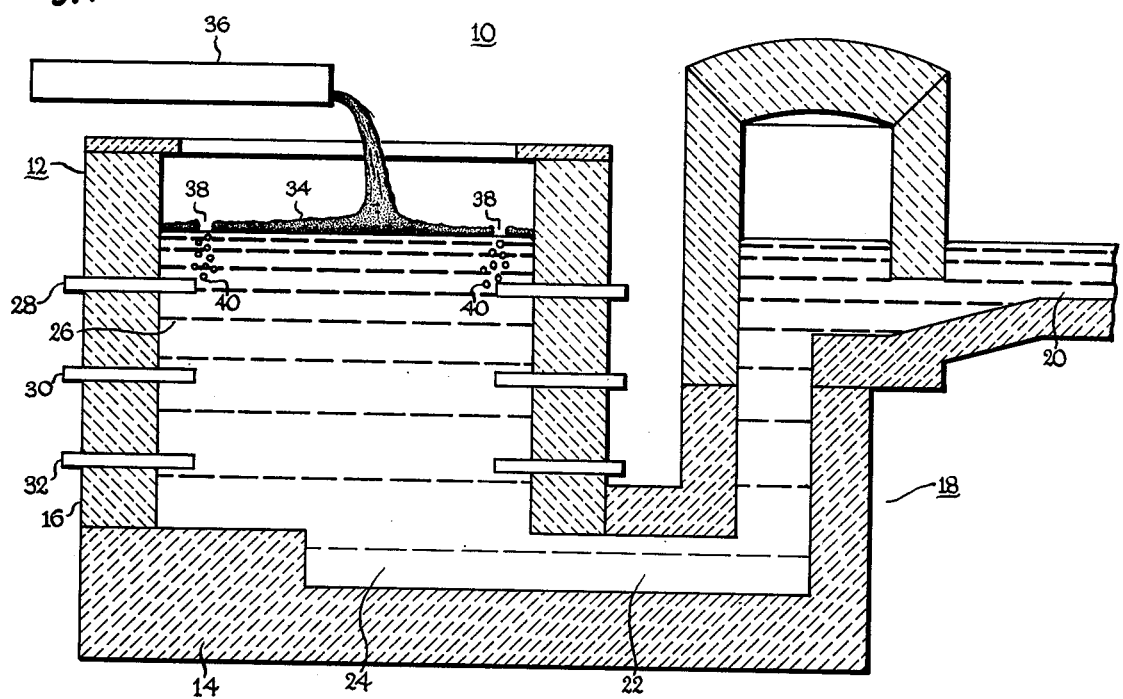
FIG. 1 is a vertical section through one electric melting furnace construction embodying the control system of the present invention.

Referring now to FIG. 1, there is shown in cross section a vertically oriented electric glass melting furnace construction 10 having a melting chamber 12 defined by a refractory bottom 14 and side walls 16, to provide a horizontal configuration which can be polygonal or circular in shape, said furnace construction further including a refining chamber 18 which leads to an otherwise conventional forehearth arrangement 20. As can be noted from said figure, the refining chamber 18 is operatively connected to the melting chamber 12 by a throat section 22 which withdraws molten glass from the bottom level 24 of the melting chamber. The molten glass 26 in the melting chamber 12 has immersed therein three sets of electrodes 28, 30 and 32 to supply electrical heating energy for melting a raw glass batch blanket 34 which lies on top of the molten glass. Continuous feeder means 36 located at the top level of the melting chamber produces a glass batch blanket extending over substantially the entire cross sectional area of the chamber. As further shown in said figure, gas vent openings 38 are formed in the glass batch blanket 34 during the melting process to permit escape of glass bubbles 40 which rise upwardly through the molten glass in the vicinity of the upper set of electrodes 28. The electrical power supply means which are separately connected to the circumferentially spaced electrode at each elevation level in the melting chamber are described below in connection with FIGS. 2–3 and further auxiliary electrode means which can be disposed in refining chamber 18 to maintain a uniform temperature in said refining chamber have not been shown.

Figure 2:
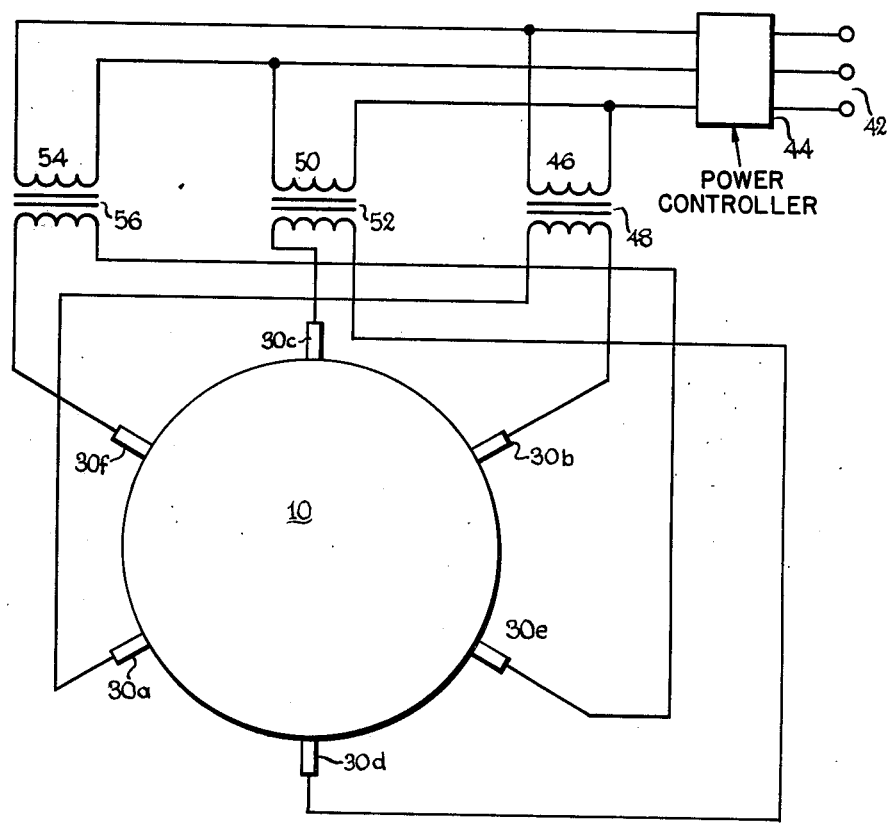
FIG. 2 is an electrical schematic circuit for a preferred power supply means to one set of electrodes and the preferred furnace construction.

FIG. 2 depicts schematically a horizontal cross section of the furnace construction 10 described in FIG. 1 to illustrate the circumferentially spaced electrodes at both electrode levels 28 and 30 along with the power supply means connected to each set of said electrodes. As therein shown, the individual electrodes 30a–30e which are located at the intermediate level 30 are also aligned in a vertical direction with correspondingly located individual electrodes for the top electrode level 28, hence the latter electrodes do not appear. A source of three-phase alternating current 42 is supplied to said intermediate electrodes 30a–30f through power controller means 44 so that each phase of the alternating current supplies power to a pair of electrodes. Accordingly, a first phase 46 of the current is supplied to a power transformer 48 for input to electrodes 30a and 30b while a second phase 50 of the current is supplied to the power transformer 52 for application to electrodes 30c and 30d and with remaining third phase 54 of the current being supplied to transformer 56 for application to final electrodes 30e and 30f of the electrode configuration. Conventional power sensing means (not shown) can also be employed for connection to said power controller means 44 in a known manner to vary the power input to the individual electrode pairs so that a desired overall power level established within said controller can be maintained by a manipulation of the individual power supplies.

Figure 3:
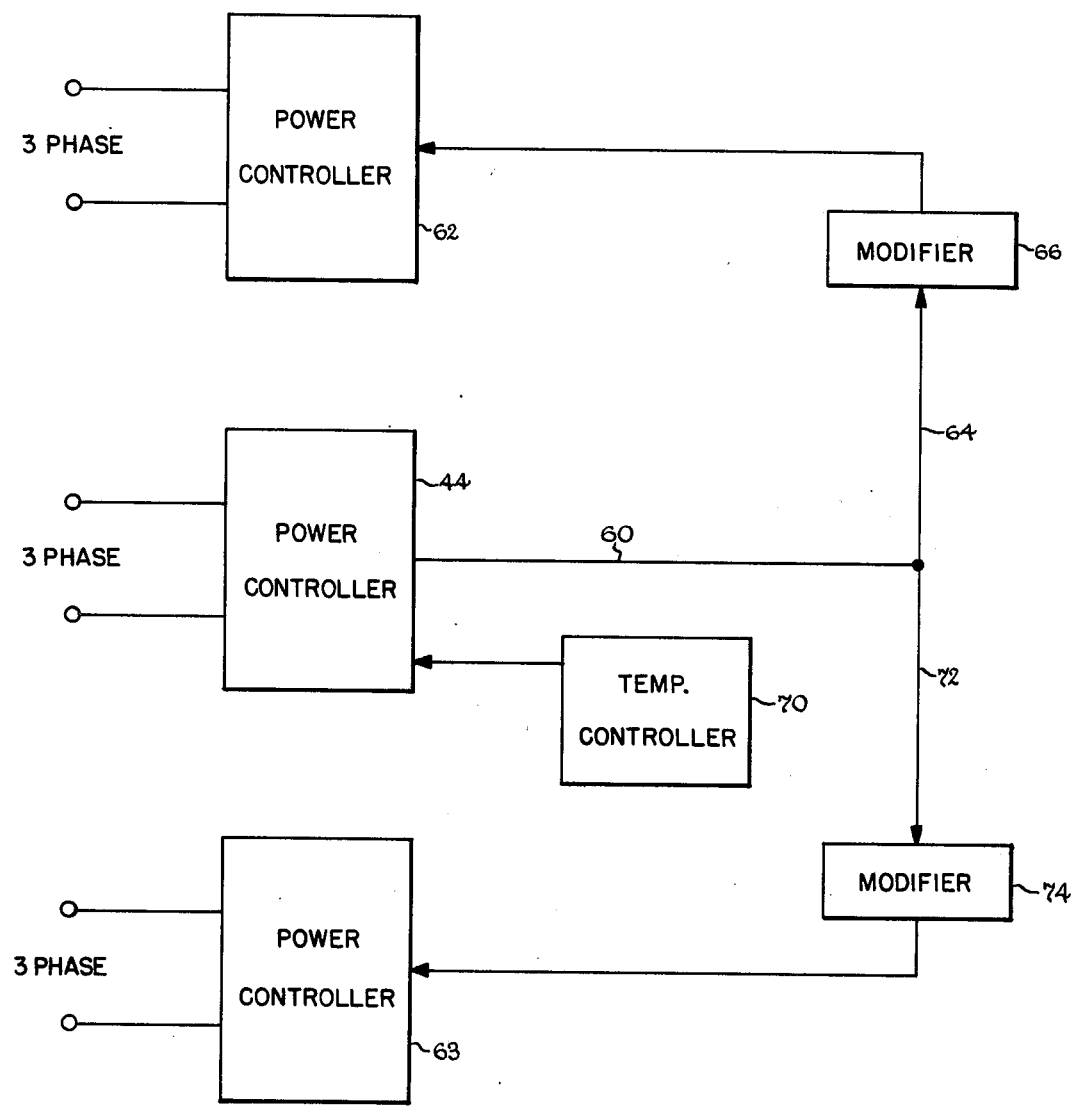
FIG. 3 is a functional block diagram embodying one type preferred control system in the present invention.

A functional block diagram 58 depicting the control system which regulates the total electrical power being supplied to the melting chamber 10 in accordance with the present invention is shown in FIG. 3. Accordingly, said power controller means 44 for the intermediate level electrodes derives a first control signal 60 to provide an input signal regulating power controller means 62 which regulates the amount of electrical power being supplied to the individual electrodes at the top electrode level 28 as well as providing an input signal to power controller means 63 which regulates the amount of electrical power being supplied to the individual electrodes at the bottom electrode level 32. Said first control signal 60 provides an input signal 64 to a first modifier means 66 which is processed in accordance with the following control relationship:

$$P_{28} = K_1 - K_2 P_{30}$$

wherein $P_{28}$ = total power supplied to electrodes 28,
$K_1$ = a power set point value for power controller 62,
$K_2$ = a power ratio value for power controller 62, and
$P_{30}$ = total power applied to electrodes 30.

Conventional circuit means (not shown) to derive the power ratio signal in the above control relationship are already known such as variable resistor means as is known circuit means to carry out the subtraction step in said equation such as an inverter circuit. Adjustable power level set point or power ratio means are also provided in each power controller for finer adjustment of temperature control throughout the entire melting chamber with variation in the operating parameters heretofore mentioned. Conventional temperature controller means 70 provides an input signal to said power controller means 44 indicative of temperature measured in the molten glass zone adjacent the intermediate electrodes. By utilizing said temperature controller means in this manner to exercise control over the power controller means 44 such that power is increased if the measured temperature falls below the set point value whereas power is decreased if said set point temperature is exceeded it becomes apparent that first control signal 60 provides the means to exercise a further degree of temperature control at the top and bottom electrode levels as well. Accordingly, said first control signal 60 provides a further input signal 72 to second modifier means 74 connected to the power controller means 63 for the bottom level electrodes 32 in the melting chamber. Said second modifier means 74 comprises a conventional electrical circuit wherein the desired power ratio is established such as from a potentiometer setting or the like in accordance with the following control relationship:

$$P_{32} = K_3 P_{30}$$

wherein
$P_{32}$ = total power applied to electrodes 32,
$K_3$ = power ratio value for power controller 63, and
$P_{30}$ = total power applied to electrodes 30.

Use of adjustable power level set point and power ratio means for implementation of both above control relationships permits a finer degree of temperature control in the melting chamber.

In operation, the total power applied to the electrodes at the intermediate electrode level will be controlled by the output of a pyrometer or other temperature sensing means (not shown) disposed in the molten glass zone adjacent said electrodes. By exercising a temperature control relationship at all electrode levels in the melting chamber as above described, there can be avoided various operational problems resulting from increasing power levels to the uppermost electrode when the power is being increased to the intermediate levels. A simultaneous power increase at both levels can produce a runaway condition attributable to melting the glass batch material faster than is being charged at the time. A thinner batch blanket loses some thermal insulating ability and glass temperatures which already are low, will continue to decrease. Increasing power input will continue to increase and call upon greater power input. This problem is avoided with the present control system which maintains a relatively constant thickness batch blanket on top of the molten glass surface and with the condition of said batch blanket permitting continuous degasification of the molten glass therebelow since a crust of only partially melted foam-type batch material impeding escape of the glass bubbles is not formed within the batch blanket.

Representative operating conditions in accordance with the present invention are provided to better illustrate the temperature control achieved therewith. Accordingly, a borosilicate glass composition comprising in percent by weight 60–70 $SiO_2$, 2.5–4.5 $Na_2O$, 4.5–7.5 $K_2O$, 0–2.3 $Al_2O_3$, 21–24 $B_2O_3$, and 0–1 F was melted continuously in the above described furnace construction having a melting surface area of approximately 25 square feet at a molten glass pull rate of approximately 7–9 tons a day. A batch blanket thickness of 8–10 inches thick was maintained after equilibrium melting conditions had been achieved along with a temperature profile of approximately 1400–1450° C at the top electrode level, approximately 1450–1500° C at the intermediate electrode level, and approximately 1430–1480° C at the bottom electrode level in the melting chamber. To maintain said equilibrium melting conditions, the electrical power applied at the individual electrode levels in terms of percentage of the total power being supplied to said melting chamber was controlled by the above described power control system at 15–35% for the top electrode level, 40–60% for the intermediate electrode level and 15–40% for the bottom electrode level. At a total operating power level of approximately 400KW, the power level at the intermediate electrode level was established by the temperature control means 70 which in turn generated an appropriate input control signal 60 proportional to power applied at electrode level 30 for application to the modifier means 66 and 74 which regulate the power input levels at the top and bottom electrode levels, respectively. The processing of said input control signal as an input signal 64 applied to first modifier means 66 at these operating conditions followed the control relationship equation previously given for regulation of power input to said top electrode level wherein a first power set point value ($K_1$) in the range 100–200KW was maintained while a power ratio value ($K_2$) in the range 0.2–0.6 was correspondingly exercised. It is evident from said control relationship that the power input to the top level electrodes was decreased from the operating range established by the set point value whenever the power level at the intermediate electrode level had been increased.

Additionally, the processing of said input control signal 60 in the second modifier means 74 was carried out in accordance with the further control relationship equation previously given for regulation of power input to said bottom electrode level. A power ratio value ($K_3$) in the range 0.25—0.6 was employed in processing said input control signal 60 when applied as input signal 72 to said second modifier means 74 so that power input to the bottom level electrode was increased power input to the intermediate electrode level and in the amount established by the particular power ratio selected for operation in the specified range given. Understandably, all of the power input values, power ratios, and power set point values above illustrated can be expected to fluctuate dependent upon variations in glass being melted, molten glass pull rates, glass batch charging rates and furnace design parameters although the control principle being exercised in accordance with the present invention still applies. For the particular glass composition herein illustrated, the refining temperature employed in the separate refining chamber of the furnace construction was approximately 1225° C so that it will be evident that no appreciable refining took place in the melting chamber. Melting temperatures substantially above 1500° C were also avoided in said melting chamber for this glass composition since excess temperatures were found to cause serious loss of $B_2O_3$ from the glass batch being melted.

It will be apparent from the foregoing description that a generally useful control system for continuous melting glass batch in a vertically oriented furnace heated entirely with electrical energy has been provided. It will be apparent to those skilled in the art that operation of the above control system can be carried out with other circuit means than above specifically disclosed, however, and which do not depart from the control principles herein disclosed. It is contemplated, therefore, to limit the present invention only by the scope of the following claims.

What we claim as new and desire to secure by United States Letters Patent is:

1. A control system for operating a glass melting furnace having a vertically oriented melting chamber to feed glass batch at the top level of said chamber and withdraw molten glass at the bottom level of the melting chambers which comprises:
   (a) a set of electrodes located adjacent said top level in the melting chamber and connected to a first power supply means,
   (b) a set of electrodes located at the bottom level in the melting chamber and connected to a second power supply means,
   (c) a set to electrodes located at a level in the melting chamber intermediate said bottom and top level electrodes and connected to a third power supply means, and
   (d) control means for applying electrical power to the top and intermediate level electrodes so that when power is increased to the intermediate level electrodes there is a decrease in power applied to the top level electrodes while a constant power ratio is maintained between the intermediate and bottom level electrodes.

2. A control system as in claim 1 which includes temperature control means for controlling the temperature of the molten glass in the zone adjacent the intermediate level electrodes.

3. A control system as in claim 2 wherein the molten glass temperature is maintained greatest in said zone.

4. A control system as in claim 1 wherein the control means utilized at all electrode levels in the melting chamber comprises power controller means.

5. A control system as in claim 4 wherein said power controller means compares the measured power level with a power level set point means in said controller means.

6. A control system as in claim 1 wherein the power supply means to each set of electrodes in three-phase alternating current connected so that each phase of the alternating current supplies power to a pair of electrodes.

7. A control system as in claim 6 wherein each phase of alternating current being supplied to a pair of electrodes is distributed thereto by separate power transformer means.

8. A control system as in claim 4 wherein a first control signal derived by the power controller means for the intermediate level electrodes provides an input signal to first modifier means connected to the power controller means for the top level electrodes and the output signal from said first modifier means provides a second input control signal to said power controller means for the top level electrodes while said first control signal provides a further input signal to second modifier means connected to the power controller means for the bottom level electrodes and the output signal from said second modifier means provides a third input control signal to said power controller means for the bottom level electrodes.

9. A power control system as in claim 1 which futher includes separately controlled heating electrodes disposed in a refining chamber connected to the bottom level of the melting chamber.

10. A power control system as in claim 9 which further includes a forehearth arrangement in said refining chamber having additional heating electrodes disposed in the forehearth arrangement which are also separately controlled.

11. In a furnace construction for continuously melting a glass batch by heating with electrodes and having a vertically oriented melting chamber to feed glass batch at the top level of the chamber and withdraw molten glass at the bottom level of the chamber, batch feeding means to supply batch at the top level of the chamber to form a blanket extending substantially over the entire cross-sectional area of said chamber and rest on the molten glass, a set of electrodes located at the top level of the chamber and spaced circumferentially to generate hot spots in the molten glass adjacent the underside of the batch blanket and connected to a first power supply means, a set of electrodes located at the bottom level in the melting chamber and connected to a second power supply means, and a set of electrodes located at a level in the melting chamber intermediate said bottom and top level electrodes and connected to a third power supply means, the improvement which comprises control means for applying electrical power to the top and intermediate level electrodes so that when power is increased to the intermediate level electrodes there is a decrease in power applied to the top level electrodes while a constant power ratio is maintained between the intermediate and bottom level electrodes.

12. The improvement in claim 11 which includes temperature control means for controlling the temperature of the molten glass in the zone adjacent the intermediate level electrodes.

13. The improvement as in claim 12 wherein the molten glass temperature is maintained greatest in said zone.

14. The improvement as in claim 11 wherein the control means utilized at all electrode levels in the melting chamber comprises power controller means.

15. The improvement as in claim 14 wherein said power controller means compares the measured power level with a power level set point means in said controller means.

16. The improvement as in claim 11 wherein the power supply means to each set of electrodes is three-phase alternating current connected so that each phase of the alternating current supplies power to a pair of electrodes.

17. The improvement as in claim 16 wherein each phase of alternating current being supplied to a pair of electrodes is distributed thereto by separate power transformer means.

18. The improvement as in claim 14 wherein a first control signal derived by the power controller means for the intermediate level electrodes provides an input signal to first modifier means connected to the power controller means for the top level electrodes and the output signal from said first modifier means provides a second input control signal to said power controller means for the top level electrodes while said first control signal provides a further input signal to second modifier means connected to the power controller means for the bottom level electrodes and the output signal from said second modifier means provides a third input control signal to said power controller means for the bottom level electrodes.

19. The improvement as in claim 11 which further includes separately controlled heating electrodes disposed in a refining chamber connected to the bottom level of the melting chamber.

20. The improvement as in claim 19 which further includes a forehearth arrangement in said refining chamber having additional heating electrodes disposed in the forehearth arrangement which are also separately controlled.

21. The improvement as in claim 11 wherein the individual electrodes at the intermediate electrode level are aligned in a vertical direction with the individual electrodes at the top electrode level.

22. In a furnace construction for continuously melting a glass batch by heating with electrodes and having a vertically oriented melting chamber to feed glass batch at the top level of the chamber and withdraw molten glass at the bottom level of the chamber, batch feeding means to supply batch at the top level of the chamber to form a blanket extending substantially over the entire cross-sectional area of said chamber and rest on the molten glass, a set of at least six electrodes located at the top level of the chamber and spaced circumferentially to generate hot spots in the molten glass adjacent the underside of the batch blanket causing a flow of gas bubbles through the molten glass at said hot spot locations for escape through the batch blanket and connected to a first power supply means of three-phase alternating current so that each phase of the alternating current supplies power to a pair of electrodes, a set of circumferentially spaced electrodes located at the bottom level in the melting chamber and connected to a second power supply means, and a set of at least six electrodes located at a level in the melting chamber intermediate said bottom and top level electrodes and connected to a third power supply means of three-phase alternating current so that each phase of the alternating current supplies power to a pair of electrodes, all individual electrodes at the intermediate electrode level being aligned in a vertical direction with the individual electrodes at the top electrode level, the improvement which comprises power controller means for applying electrical power to the top and intermediate level electrodes so that when power is increased to the intermediate level electrodes there is a decrease in power applied to the top level electrodes while a constant power ratio is maintained between the intermediate and bottom level electrodes.

23. The improvement as in claim 22 which includes temperature control means for controlling the temperature of the molten glass in the zone adjacent the intermediate level electrodes.

24. The improvement as in claim 23 wherein the molten glass temperature is maintained greatest in said zone.

25. The improvement as in claim 22 wherein said power controller means compares the measured power level with a power level set point means in said controller means.

26. The improvement as in claim 22 wherein each phase of alternating current being supplied to a pair of electrodes is distributed thereto by separate power transformer means.

27. The improvement as in claim 22 wherein a first control signal derived by the power controller means for the intermediate level electrodes provides an input signal to first modifier means connected to the power controller means for the top level electrodes and the output signal from said first modifier means provides a second input control signal to said power controller means for the top level electrodes while said first control signal provides a further input signal to second modifier means connected to the power controller means for the bottom level electrodes and the output signal from said second modifier means provides a third input control signal to said power controller means for the bottom level electrodes.

28. The improvement as in claim 22 which further includes separately controlled heating electrodes disposed in a refining chamber connected to the bottom level of the melting chamber.

29. The improvement as in claim 29 which further includes a forehearth arrangement in said refining chamber having additional heating electrodes disposed in the forehearth arrangement which are also separately controlled.

30. The improvement as in claim 27 wherein the power level set point means in each power controller means are adjustable.

31. The improvement as in claim 22 wherein the power controller means for the intermediate level electrodes further includes temperature control means to maintain constant temperature in the molten glass zone adjacent said electrodes.

32. The improvement as in claim 28 wherein the first control signal is derived in a power controller which receives an input power level signal from each phase of the alternating current being supplied to the electrodes at the intermediate level electrodes and also receives an input signal indicative of temperature measured in the molten glass zone adjacent said electrodes.

* * * * *